Patented Nov. 9, 1937

2,098,335

UNITED STATES PATENT OFFICE 2,098,335

MANUFACTURE OF DERIVATIVES OF POLY-HYDROXY COMPOUNDS

Henry Dreyfus, London, England

No Drawing. Application June 3, 1936, Serial No. 83,269. In Great Britain June 22, 1935

5 Claims. (Cl. 260—152)

This invention relates to improvements in the manufacture of derivatives of polymeric hydroxy compounds and particularly to improvements in the manufacture of ethers of cellulose and other polymeric hydroxy compounds.

The methods commonly employed for the manufacture of ethers of cellulose and other polymeric hydroxy compounds consist in reacting on the compound with a suitable etherifying agent in the presence of caustic alkali and water. It is found, however, that in such processes there is a tendency for the polymeric compounds to be decomposed or converted into other substances, which is particularly undesirable in the case of the manufacture of ethers of cellulose.

I have now discovered that by carrying out etherification under substantially anhydrous conditions in the presence of an organic base the tendency to decomposition of the polymeric hydroxy compounds, and particularly the tendency to degradation of cellulosic materials, may be very considerably reduced. According to the present invention, therefore, ethers of cellulose and other polymeric hydroxy compounds are prepared by reacting upon the compound with a suitable etherifying agent in the presence of an organic base and in the substantial absence of water, other than that normally present in hygroscopic materials i. e. about 5%–8% in the case of cellulosic materials. The process of the present invention is applicable broadly to the etherification of polymeric hydroxy compounds, which term is to be understood to include derivatives thereof containing free hydroxy groups, but it is particularly valuable for the etherification of cellulosic materials, which term is to be understood to include cellulose derivatives containing free hydroxy groups, since as has been stated above degradation of such materials during etherification is in general particularly undesirable, and the invention will therefore be described with particular reference thereto.

The present invention is particularly concerned with the production of cellulose ethers having a relatively low ether content, for example a content of ¼ to ½ up to about 1 ether group per $C_6H_{10}O_5$ molecule. Ethers of this nature may be obtained either by employing only sufficient etherifying agent in relation to the cellulosic material to yield a product of the desired ether content, or by interrupting the reaction at the stage when the desired product has been obtained.

The cellulosic materials etherified in accordance with the present invention may be cotton, for example in the form of linters, chemical or mechanical wood pulps, partially esterified or etherified celluloses and cellulose derivatives containing etherifiable ester or ether groups, e. g. cellulose glycollate or oxy-ethyl cellulose, whether partially or wholly esterified or etherified. The materials may be pretreated in any suitable manner, e. g. with mineral or organic acids. Thus wood pulp which has been pretreated by the process described in my U. S. Patent No. 1,711,110 and U. S. application S. No. 705,899 filed 9th January, 1934, may be employed, or cellulosic material which has been pretreated with a lower fatty acid as described in my U. S. Patents Nos. 1,708,787 and 1,831,101. If the cellulosic material is subjected to a treatment with aqueous reagents it must be thoroughly dried before etherification.

The etherification according to the present invention may be carried out so that either a simple or a mixed cellulose ether is produced. As examples of suitable etherifying agents may be mentioned alkyl and aralkyl halides and sulphates, for example dimethyl and diethyl sulphates, methyl and ethyl chlorides, benzyl chloride, chlor-brom-methane and ethane, and halogenated acids and esters of such acids, for example chloroacetic acid, brom-acetic acid, ethyl chlor-acetate and ethyl brom-acetate.

As examples of suitable organic bases may be mentioned alkylamines, and particularly the lower alkylamines, e. g. methylamines and ethylamines, pyridine, piperidine, aniline, and methyl anilines. The base should be present at least in sufficient proportions to neutralize substantially all acid formed during the etherification and is preferably present in considerably larger quantities, e. g. 200 to 400% or more of that theoretically required for complete neutralization.

The etherification may be carried out in the presence of a diluent, which is preferably substantially water-immiscible, for example benzene, toluene, petroleum ether, tetra- or deca-hydronaphthalene or other hydrocarbon, or an ether, for example diethyl ether, ethyl propyl ether, or di-isopropyl ether. Preferably the diluent is a solvent for the organic base and etherifying agent employed and it may also be a solvent for the ether produced.

Fabrics and other articles may be etherified with retention of their structure, e. g. by etherification in the presence of a suitable diluent or by the use of a gaseous etherifying medium.

The conditions of temperature and pressure prevailing during the reaction will depend upon the particular reagents employed and particularly upon the nature of the etherifying agent; but it may be stated generally that while it is desirable that they should be sufficiently high to bring about the desired degree of etherification within a reasonably short time, they should not be so high that an undesired degree of decomposition or degradation is produced. A certain degree of degradation may in certain circumstances be desirable, for example in order to produce a product which is soluble in particular solvents. In general temperatures of from 30 to 50 or 70° C. are suitable, though higher temperatures may be employed if desired. The reaction may be carried out under ordinary or slightly increased pressures, for example 5 to 10 atmospheres or under considerably higher pressures, e. g. 15 to 100 atmospheres or more.

The etherification may be effected by reacting the cellulosic material with the etherifying agent in the presence of the base and the diluent, if one is employed, in a closed vessel or the etherifying medium, which may be a liquid or a vapour, may be circulated continuously through the cellulosic material. The organic base may either be incorporated in the cellulosic material, for example by a suitable pretreatment, or it may be contained in the etherifying medium, or may be present both in the cellulosic material and in the medium.

The following examples illustrate the invention but are not to be regarded as limiting it in any way.

Example 1

100 parts of cellulose are soaked in diethylamine until they are thoroughly impregnated and are then pressed out until they contain about 200 parts of diethylamine. They are then introduced, together with about 500 parts of benzene and 200 parts of diethyl sulphate, into an autoclave which is maintained at a temperature of 60–70° C. for about 8–12 hours according to the degree of etherification which is required. The autoclave is then allowed to cool and the product is removed, washed and dried.

Example 2

100 parts of cellulose are introduced into an autoclave with about 150 parts of ethyl chloride, 200 parts of pyridine and 500 parts of ether and the temperature is maintained at about 30–50° C. for 6–10 hours or longer according to the degree of etherification required. After cooling the cellulose ether is separated, washed and dried.

The products of the present invention may be used directly for industrial purposes, for example the manufacture of filaments, films and lacquers, or particularly in the case of ethers of low ether content, as starting materials for the manufacture of other derivatives, for example cellulose ether-esters. The manufacture of ether-esters from the products of the present invention, which is descriped and claimed in my U. S. application S. No. 83,271 filed June 3, 1936 corresponding to British application No. 17979/35 filed 22nd June, 1935, may be carried out by any suitable esterification process, and it is found that, in general, milder conditions or shorter esterification periods can be employed than when the starting material is cellulose, since the etherification process of the present invention appears to yield materials which are more readily esterified than are the unetherified celluloses themselves.

Examples of other polymeric hydroxy compounds to which the process of the present invention is applicable are polymerized vinyl alcohol and starch.

Having described my invention, what I desire to secure by Letters Patent is:—

1. Process for the production of cellulose ethers, which comprises reacting on fibrous cellulosic materials with etherifying agents under substantially anhydrous conditions in the presence of aliphatic organic bases.

2. Process for the production of cellulose ethers, which comprises reacting on fibrous cellulosic materials under substantially anhydrous conditions in the presence of aliphatic organic bases with etherifying agents selected from the group consisting of compounds having the formula RX or $(R)_2SO_4$ where X is a halogen atom and R is an alkyl or aralkyl hydrocarbon radicle or a carboxy or esterified carboxy substituted derivative thereof.

3. Process for the production of cellulose ethers, which comprises reacting on fibrous cellulosic materials with etherifying agents under substantially anhydrous conditions in the presence of aliphatic organic bases, and interrupting the reaction when a cellulose ether containing not more than one ether radicle per $C_6H_{10}O_5$ molecule is produced.

4. Process for the production of cellulose ethers, which comprises reacting on fibrous cellulosic materials under substantially anhydrous conditions in the presence of organic bases and diluents with etherifying agents selected from the group consisting of compounds having the formula RX or $(R)_2SO_4$ where X is a halogen atom and R is an alkyl or aralkyl hydrocarbon radicle or a carboxy or esterified carboxy substituted derivative thereof.

5. Process for the production of cellulose ethers, which comprises reacting on fibrous cellulosic materials at a temperature of 30 to 70° C. under substantially anhydrous conditions in the presence of aliphatic organic bases with etherifying agents selected from the group consisting of compounds having the formula RX or $(R)_2SO_4$ where X is a halogen atom and R is an alkyl or aralkyl hydrocarbon radicle or a carboxy or esterified carboxy substituted derivative thereof.

HENRY DREYFUS.